US011597393B2

(12) United States Patent
Dasalukunte et al.

(10) Patent No.: US 11,597,393 B2
(45) Date of Patent: Mar. 7, 2023

(54) SYSTEMS, METHODS, AND DEVICES FOR DRIVING CONTROL

(71) Applicant: Intel Corporation, Santa Clara, CA (US)

(72) Inventors: Deepak Dasalukunte, Beaverton, OR (US); Richard Dorrance, Hillsboro, OR (US); Ignacio Alvarez, Portland, OR (US); Maria Soledad Elli, Hillsboro, OR (US); Sridhar Sharma, Palo Alto, CA (US); Satish Jha, Portland, OR (US); Kathiravetpillai Sivanesan, Portland, OR (US); S M Iftekharul Alam, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 156 days.

(21) Appl. No.: 16/830,349

(22) Filed: Mar. 26, 2020

(65) Prior Publication Data
US 2020/0238998 A1    Jul. 30, 2020

(51) Int. Cl.
B60W 40/04    (2006.01)
B60W 60/00    (2020.01)
(Continued)

(52) U.S. Cl.
CPC ........ B60W 40/04 (2013.01); B60W 50/0097 (2013.01); B60W 60/0017 (2020.02);
(Continued)

(58) Field of Classification Search
CPC ............. B60W 40/04; B60W 50/0097; B60W 60/0017; B60W 2555/60; B60W 2556/50;
(Continued)

(56) References Cited

U.S. PATENT DOCUMENTS 9,125,019 B1 * 9/2015 Heikkila ............... H04W 4/023
9,251,703 B1 * 2/2016 Mbekeani .......... G08G 1/09675
(Continued)

FOREIGN PATENT DOCUMENTS

EP    2915718 A1    9/2015
EP    3287334 A2    2/2018
(Continued)

OTHER PUBLICATIONS

Meuser, T. et al., "Dynamic Vehicle Path-Planning in the Presence of Traffic Events", The 44th IEEE Conference on Local Computer Networks (LCN 2019), dated Oct. 14-17, 2019, 8 pages, Osnabrück, Germany.
(Continued)

Primary Examiner — Dale W Hilgendorf
(74) Attorney, Agent, or Firm — Viering, Jentschura & Partner mbB

(57) ABSTRACT

According to various embodiments, a method for operating a vehicle may include determining a vehicular area having traffic conditions or characteristics different from traffic conditions of a current or previous location of the vehicle; obtaining traffic and driving information for the determined vehicular region; changing or updating one or more of driving model parameters of a safety driving model during operation of the vehicle based on the obtained traffic and driving information; and controlling the vehicle to operate in accordance with the safety driving model using the one or more changed or updated driving model parameters. A vehicle may seamlessly update operational rules and/or handover of traffic and driving information for transitioning from one region to another.

19 Claims, 8 Drawing Sheets

(51) Int. Cl.
  *G08G 1/0969* (2006.01)
  *G08G 1/0967* (2006.01)
  *B60W 50/00* (2006.01)

(52) U.S. Cl.
  CPC ......... *G08G 1/0967* (2013.01); *G08G 1/0969* (2013.01); *G08G 1/096725* (2013.01); *B60W 2554/406* (2020.02); *B60W 2554/408* (2020.02); *B60W 2555/60* (2020.02); *B60W 2556/50* (2020.02)

(58) Field of Classification Search
  CPC ...... B60W 2554/406; B60W 2554/408; G08G 1/0967; G08G 1/096725; G08G 1/0969
  See application file for complete search history.

(56) References Cited

U.S. PATENT DOCUMENTS

| | | | |
|---|---|---|---|
| 10,081,357 | B2 | 9/2018 | Saigusa et al. |
| 10,291,481 | B2* | 5/2019 | Foster .................. H04L 41/145 |
| 10,324,463 | B1* | 6/2019 | Konrardy ............. G05D 1/0278 |
| 10,332,321 | B2 | 6/2019 | Kumabe |
| 10,339,731 | B2 | 7/2019 | Kumabe |
| 10,434,935 | B1* | 10/2019 | Zhang .............. G08G 1/096791 |
| 10,593,202 | B1 | 3/2020 | Christensen et al. |
| 2005/0060069 | A1 | 3/2005 | Breed et al. |
| 2005/0134440 | A1 | 6/2005 | Breed |
| 2007/0208497 | A1* | 9/2007 | Downs ................. G08G 1/0104 701/117 |
| 2011/0034183 | A1* | 2/2011 | Haag .................... G08G 1/0967 455/456.3 |
| 2014/0156133 | A1* | 6/2014 | Cullinane ........... B60W 50/082 701/23 |
| 2014/0309913 | A1* | 10/2014 | Ricci .................. G01C 21/3691 701/117 |
| 2015/0241878 | A1 | 8/2015 | Crombf7 et al. |
| 2016/0362104 | A1 | 12/2016 | Miller et al. |
| 2017/0092121 | A1* | 3/2017 | Augst ................. B60W 50/082 |
| 2017/0259832 | A1* | 9/2017 | Lathrop ............. G01C 21/3697 |
| 2017/0369055 | A1 | 12/2017 | Saigusa et al. |
| 2018/0157264 | A1* | 6/2018 | Isaacs ..................... G08G 1/091 |
| 2018/0224846 | A1* | 8/2018 | Kovacs ................ G08G 1/0141 |
| 2018/0283895 | A1* | 10/2018 | Aikin ................. G01C 21/3415 |
| 2018/0329428 | A1* | 11/2018 | Nagy .................... G05D 1/0088 |
| 2018/0342157 | A1* | 11/2018 | Donnelly ............. G08G 1/0145 |
| 2018/0345961 | A1 | 12/2018 | Saigusa et al. |
| 2019/0351899 | A1 | 11/2019 | Adam et al. |
| 2020/0043342 | A1 | 2/2020 | Cunningham |
| 2020/0128372 | A1 | 4/2020 | Zhang et al. |
| 2020/0168094 | A1 | 5/2020 | Shimodaira et al. |
| 2020/0201354 | A1* | 6/2020 | Beaurepaire ........... G08G 1/147 |
| 2020/0207371 | A1* | 7/2020 | Dougherty ............. H04W 4/46 |
| 2021/0122398 | A1* | 4/2021 | Kim ........................ H04W 4/46 |
| 2021/0146944 | A1* | 5/2021 | Kun ................ B60W 30/18154 |
| 2021/0155243 | A1* | 5/2021 | Taniguchi ....... B60W 30/18163 |
| 2021/0229691 | A1* | 7/2021 | Liu ........................ G06V 20/20 |
| 2021/0323577 | A1* | 10/2021 | Gyllenhammar ..... B60W 40/04 |

FOREIGN PATENT DOCUMENTS

| | | |
|---|---|---|
| WO | 2015178839 A1 | 11/2015 |
| WO | 2019017253 A1 | 1/2019 |

OTHER PUBLICATIONS

Jomrich, F. et al., "Dynamic Map Update Protocol for Highly AutomateDriving Vehicles", Proceedings of the 3rd International Conference on Vehicle Technology and Intelligent Transport Systems (VEHITS 2017), dated Apr. 2017, 11 pages, At Porto, Portugal.

Liu, H., "Dynamic Map Update Using Connected Vehicle Data", dated May 1, 2016, downloaded Mar. 25, 2020, 2 pages.

Waibel, Sartre: Autonomous cars platoons, retrieved from https://spectrum.ieee.org/automaton/robotics/industrialrobots/sartre-autonomous-car-platoons on Jul. 14, 2020, dated Jan. 31, 2011, 3 pages.

Ackerman, A Thousand Kilobots Self-Assemble Into Complex Shapes, retrieved from https://spectrum.ieee.org/automaton/robotics/robotics-hardware/a-thousand-kilobots-self-assemble on Jul. 7, 2020, dated Aug. 14, 2014, 5 pages.

Alonso-Mora et al., Multi-robot Navigation in Formation via Sequential Convex Programming, 2015 IEEE/RSJ International Conference on Intelligent Robots and Systems (IROS) Congress Center Hamburg, Sep. 28-Oct. 2, 2015, pp. 4634-4641, Hamburg, Germany.

Mizokami, The Pentagon's Autonomous Swarming Drones Are the Most Unsettling Thing You'll See Today, retrieved from https://www.popularmechanics.com/military/aviation/a24675/pentagon-autonomous-swarming-drones/ on Jul. 6, 2020, dated Jan. 19, 2017, 8 pages.

Apu et al., Battle Swarm: An Evolutionary Approach to Complex Swarm Intelligence, Department of Computer Science, University of Calgary, Jan. 2006, 12 pages.

Toor et al., Vehicle Ad Hoc Networks: Applications and Related Technical Issues, IEEE Communication Surveys & Tutorials, 2008, pp. 74-88, 3rd Quarter 2008, vol. 10, No. 3.

Buchenscheit et al., A VANET-based Emergency Vechile Warning System, In the Proceedings of the IEEE Vechicular Networking Convergance, 2009, 8 pages, 2009 IEEE.

Campos-Macias et al., A Hybrid Method for Online Trajectory Planning of Mobile Robots in Cluttered Environments, IEEE Robotics and Automation Letters, Apr. 2017, pp. 935-942, vol. 2, No. 2.

Spears et al., An Overview of Physicomimetics, Computer Science Department, University of Wyoming, Swarm Robotics WS 2004, LNCS 3342, 2005, pp. 84-97.

European Search Report issued for the corresponding European patent application No. 20207132.0, dated Aug. 4, 2021, 8 pages (for informational purposes only).

* cited by examiner

SYSTEMS, METHODS, AND DEVICES FOR DRIVING CONTROL

TECHNICAL FIELD

Various aspects of this disclosure generally relate to driving systems.

BACKGROUND

Autonomous driving utilizes reliable driving control and safety systems that process data acquired at a vehicle. Using data acquired at the vehicle, which may include data about the vehicle's environment or data about the vehicle itself, the vehicle may alter its movements, modify its positioning with respect to external elements, and/or respond to newly detected events. Additionally, autonomous vehicles may be configured to communicate with other devices, such as other vehicles, network infrastructure elements, wireless devices, etc., to assist in the mobility control, provide faster information processing, and, generally speaking, communicate information in order to improve overall system performance.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 1:
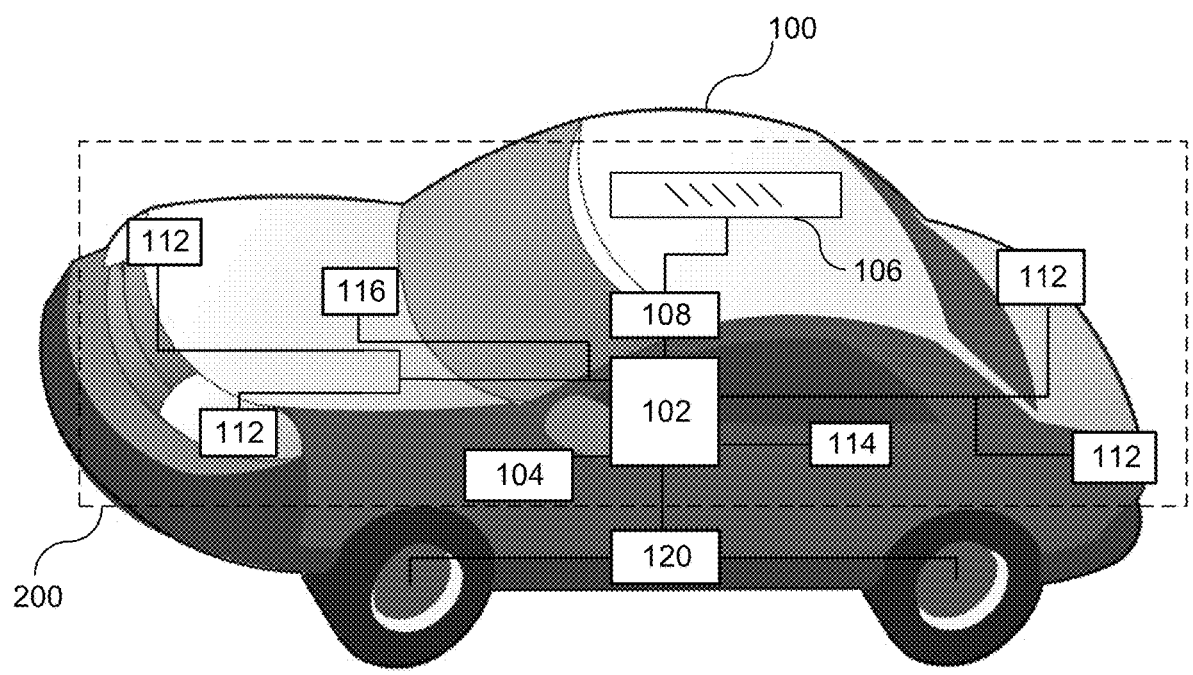
FIG. 1 shows an exemplary autonomous vehicle in accordance with various aspects of the present disclosure.

The following detailed description refers to the accompanying drawings that show, by way of illustration, exemplary details and aspects in which the invention may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and in the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" is understood as a (non-transitory) computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

A "ground vehicle" may be understood to include any type of vehicle, as described above, which is configured to traverse or be driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Similar to a ground vehicle having wheels, belts, etc., for providing mobility on terrain, an "aerial vehicle" may have one or more propellers, wings, fans, among others, for providing the ability to maneuver in the air. An "aquatic vehicle" may be understood to be any type of vehicle, as described above, which is capable of being maneuvers on or below the surface of liquid, e.g., a boat on the surface of water or a submarine below the surface. It is appreciated that some vehicles may be configured to operate as one of more of a ground, an aerial, and/or an aquatic vehicle.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (e.g., fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of propulsion unit(s), types of tires or propellers of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout the present disclosure, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle to operate according to the manners described herein.

Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

FIG. 1 shows a vehicle 100 including a mobility system 120 and a control system 200 (see also FIG. 2) in accordance with various aspects. It is appreciated that vehicle 100 and control system 200 are exemplary in nature and may thus be simplified for explanatory purposes. For example, while vehicle 100 is depicted as a ground vehicle, aspects of this disclosure may be equally or analogously applied to aerial vehicles such as drones or aquatic vehicles such as boats. Furthermore, the quantities and locations of elements, as well as relational distances (as discussed above, the figures are not to scale) are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels. The vehicular housing, such as an automobile body, drone body, plane or helicopter fuselage, boat hull, or similar type of vehicular body dependent on the type of vehicle that vehicle 100 is.

In addition to including a control system 200, vehicle 100 may also include a mobility system 120. Mobility system 120 may include components of vehicle 100 related to steering and movement of vehicle 100. In some aspects, where vehicle 100 is an automobile, for example, mobility system 120 may include wheels and axles, a suspension, an engine, a transmission, brakes, a steering wheel, associated electrical circuitry and wiring, and any other components used in the driving of an automobile. In some aspects, where vehicle 100 is an aerial vehicle, mobility system 120 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 100 is an aquatic or sub-aquatic vehicle, mobility system 120 may include any one or more of rudders, engines, propellers, a steering wheel, associated electrical circuitry and wiring, and any other components used in the steering or movement of an aquatic vehicle. In some aspects, mobility system 120 may also include autonomous driving functionality, and accordingly may include an interface with one or more processors 102 configured to perform autonomous driving computations and decisions and an array of sensors for movement and obstacle sensing. In this sense, the mobility system 120 may be provided with instructions to direct the navigation and/or mobility of vehicle 100 from one or more components of the control system 200. The autonomous driving components of mobility system 120 may also interface with one or more radio frequency (RF) transceivers 108 to facilitate mobility coordination with other nearby vehicular communication devices and/or central networking components that perform decisions and/or computations related to autonomous driving.

Figure 2:
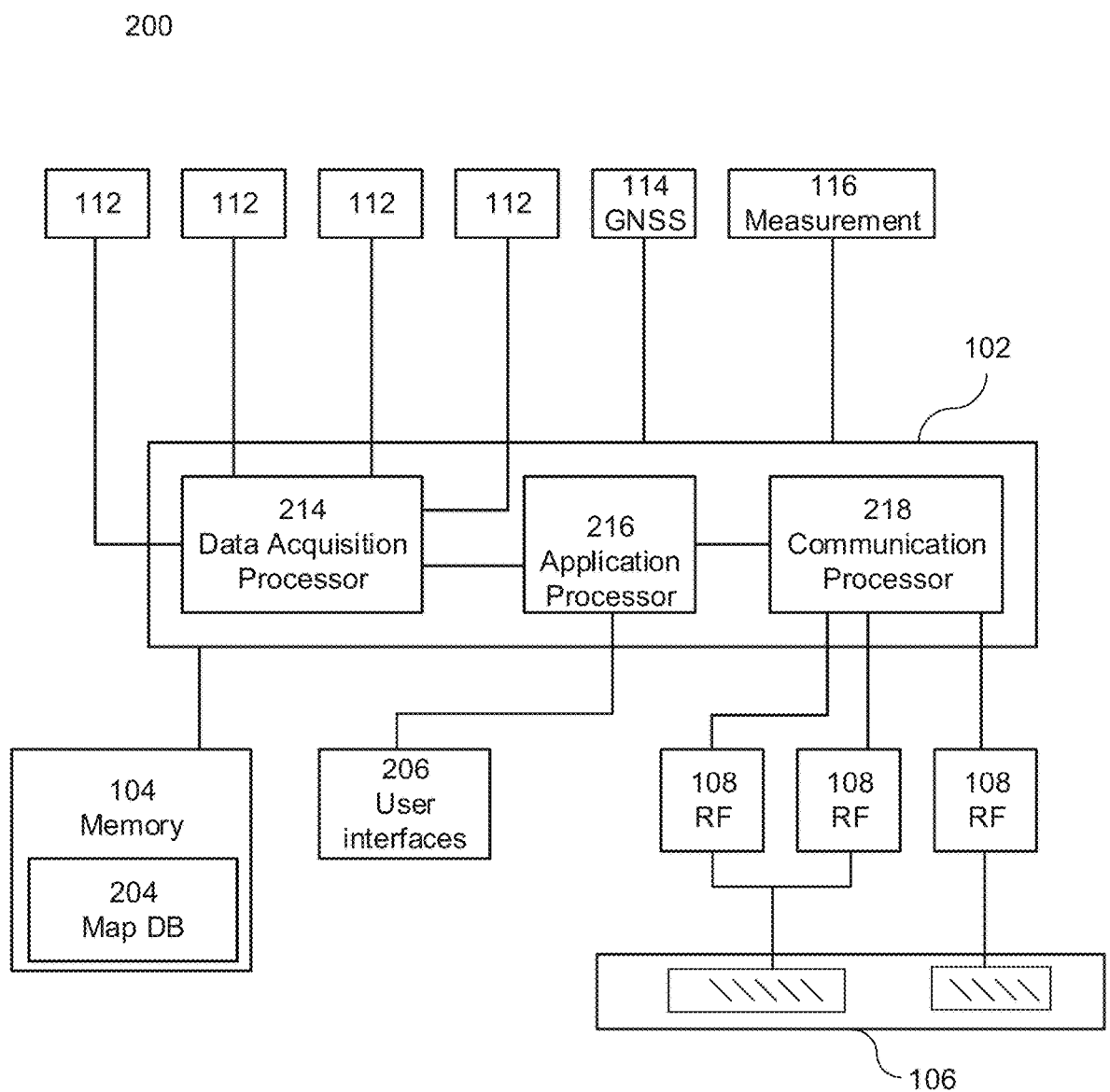
FIG. 2 shows various exemplary electronic components of a safety system of the vehicle in accordance with various aspects of the present disclosure.

The control system 200 may include various components depending on the requirements of a particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data acquisition devices 112, one or more position devices 114 which may include components and circuitry for receiving and determining a position based on a Global Navigation Satellite System (GNSS) and/or a Global Positioning System (GPS), and one or more measurement sensors 116, e.g. speedometer, altimeter, gyroscope, velocity sensors, etc.

The control system 200 may be configured to control the vehicle's 100 mobility via mobility system 120 and/or interactions with its environment, e.g. communications with other devices or network infrastructure elements (NIEs) such as base stations, via data acquisition devices 112 and the radio frequency communication arrangement including the one or more RF transceivers 108 and antenna system 106.

The one or more processors 102 may include a data acquisition processor 214, an application processor 216, a communication processor 218, and/or any other suitable processing device. Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 may include an internal memory for such storage.

The data acquisition processor 216 may include processing circuitry, such as a CPU, for processing data acquired by data acquisition units 112. For example, if one or more data acquisition units are image acquisition units, e.g. one or more cameras, then the data acquisition processor may include image processors for processing image data using the information obtained from the image acquisition units as an input. The data acquisition processor 216 may therefore be configured to create voxel maps detailing the surrounding of the vehicle 100 based on the data input from the data acquisition units 112, i.e., cameras in this example.

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), a user interfaces (UI) 206 for supporting user interaction with vehicle 100, and/or various user applications. Application processor 216 may interface with communication processor 218 and act as a source (in the transmit path) and a sink (in the receive path) for user data, such as voice data, audio/video/image data, messaging data, application data, basic Internet/web access data, etc. In the transmit path, communication processor 218 may therefore receive and process outgoing data provided by application processor 216 according to the layer-specific functions of the protocol stack, and provide the resulting data to digital signal processor 208. Communication processor 218 may then perform physical layer processing on the received data to produce digital baseband samples, which digital signal processor may provide to RF transceiver(s) 108. RF transceiver(s) 108 may then process the digital baseband samples to convert the digital baseband samples to analog RF signals, which RF transceiver(s) 108 may wirelessly transmit via antenna system 106. In the receive path, RF transceiver(s) 108 may receive analog RF signals from antenna system 106 and process the analog RF signals to obtain digital baseband samples. RF transceiver(s) 108 may provide the digital baseband samples to communication processor 218, which may perform physical layer processing on the digital baseband samples. Communication processor 218 may then provide the resulting data to other processors of the one or more processors 102, which may process the resulting data according to the layer-specific functions of the protocol stack and provide the resulting incoming data to application processor 216. Application processor 216 may then handle the incoming data at the application layer, which can include execution of one or more application programs with the data and/or presentation of the data to a user via one or more user interfaces 206. User interfaces 206 may include one or more screens, microphones, mice, touchpads, keyboards, or any other interface providing a mechanism for user input.

The communication processor 218 may include a digital signal processor and/or a controller which may direct such communication functionality of vehicle 100 according to the communication protocols associated with one or more radio access networks, and may execute control over antenna system 106 and RF transceiver(s) 108 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness, the configuration of vehicle 100 shown in FIGS. 1 and 2 may depict only a single instance of such components.

Vehicle 100 may transmit and receive wireless signals with antenna system 106, which may be a single antenna or an antenna array that includes multiple antenna elements. In some aspects, antenna system 106 may additionally include analog antenna combination and/or beamforming circuitry.

In the receive (RX) path, RF transceiver(s) 108 may receive analog radio frequency signals from antenna system 106 and perform analog and digital RF front-end processing on the analog radio frequency signals to produce digital baseband samples (e.g., In-Phase/Quadrature (IQ) samples) to provide to communication processor 218. RF transceiver(s) 108 may include analog and digital reception components including amplifiers (e.g., Low Noise Amplifiers (LNAs)), filters, RF demodulators (e.g., RF IQ demodulators), and analog-to-digital converters (ADCs), which RF transceiver(s) 108 may utilize to convert the received radio frequency signals to digital baseband samples. In the transmit (TX) path, RF transceiver(s) 108 may receive digital baseband samples from communication processor 218 and perform analog and digital RF front-end processing on the digital baseband samples to produce analog radio frequency signals to provide to antenna system 106 for wireless transmission. RF transceiver(s) 108 may thus include analog and digital transmission components including amplifiers (e.g., Power Amplifiers (PAs)), filters, RF modulators (e.g., RF IQ modulators), and digital-to-analog converters (DACs), which RF transceiver(s) 108 may utilize to mix the digital baseband samples received from communication processor 218 and produce the analog radio frequency signals for wireless transmission by antenna system 106. In some aspects, communication processor 218 may control the radio transmission and reception of RF transceiver(s) 108, including specifying the transmit and receive radio frequencies for operation of RF transceiver(s) 108.

According to some aspects, communication processor 218 includes a baseband modem configured to perform physical layer (PHY, Layer 1) transmission and reception processing to, in the transmit path, prepare outgoing transmit data provided by communication processor 218 for transmission via RF transceiver(s) 108, and, in the receive path, prepare incoming received data provided by RF transceiver(s) 108 for processing by communication processor 218. The baseband modem may include a digital signal processor and/or a controller. The digital signal processor may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancellation, and any other physical layer processing functions. The digital signal processor may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, the digital signal processor may include one or more processors configured to retrieve and execute program code that defines control and processing logic for physical layer processing operations. In some aspects, the digital signal processor may execute processing functions with software via the execution of executable instructions. In some aspects, the digital signal processor may include one or more dedicated hardware circuits (e.g., ASICs, FPGAs, co-processors, and other hardware) that are digitally configured to execute specific processing functions, where the one or more processors of digital signal processor may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of the digital signal processor may be realized as a coupled integrated circuit.

Vehicle 100 may be configured to operate according to one or more radio communication technologies. The digital signal processor of the communication processor 218 may be responsible for lower-layer processing functions (e.g., Layer 1/PHY) of the radio communication technologies, while a controller of the communication processor 218 may be responsible for upper-layer protocol stack functions (e.g., Data Link Layer/Layer 2 and/or Network Layer/Layer 3). The controller may thus be responsible for controlling the radio communication components of vehicle 100 (antenna system 106, RF transceiver(s) 108, position device 114, etc.) in accordance with the communication protocols of each supported radio communication technology, and accordingly may represent the Access Stratum and Non-Access Stratum (NAS) (also encompassing Layer 2 and Layer 3) of each supported radio communication technology. The controller may be structurally embodied as a protocol processor configured to execute protocol stack software (retrieved from a controller memory) and subsequently control the radio communication components of vehicle 100 to transmit and receive communication signals in accordance with the corresponding protocol stack control logic defined in the protocol stack software. The controller may include one or more processors configured to retrieve and execute program code that defines the upper-layer protocol stack logic for one or more radio communication technologies, which can include Data Link Layer/Layer 2 and Network Layer/Layer 3 functions. The controller may be configured to perform both user-plane and control-plane functions to facilitate the transfer of application layer data to and from vehicle 100 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by the controller of communication processor 218 may include executable instructions that define the logic of such functions.

In some aspects, vehicle 100 may be configured to transmit and receive data according to multiple radio communication technologies. Accordingly, in some aspects one or more of antenna system 106, RF transceiver(s) 108, and communication processor 218 may include separate components or instances dedicated to different radio communication technologies and/or unified components that are shared between different radio communication technologies. For example, in some aspects, multiple controllers of communication processor 218 may be configured to execute multiple protocol stacks, each dedicated to a different radio communication technology and either at the same processor or different processors. In some aspects, multiple digital signal processors of communication processor 218 may include separate processors and/or hardware accelerators that are dedicated to different respective radio communication technologies, and/or one or more processors and/or hardware accelerators that are shared between multiple radio communication technologies. In some aspects, RF transceiver(s) 108 may include separate RF circuitry sections dedicated to different respective radio communication technologies, and/or RF circuitry sections shared between multiple radio communication technologies. In some aspects, antenna system 106 may include separate antennas dedicated to different respective radio communication technologies, and/or antennas shared between multiple radio communication technologies. Accordingly, antenna system 106, RF transceiver(s) 108, and communication processor 218 can encompass separate and/or shared components dedicated to multiple radio communication technologies.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Communication processor 218 may be configured to operate via a first RF transceiver of the one or more RF transceivers(s) 108 according to different desired radio communication protocols or standards. By way of example, communication processor 218 may be configured in accordance with a Short-Range mobile radio communication standard such as e.g. Bluetooth®, Zigbee®, and the like, and the first RF transceiver may correspond to the corresponding Short-Range mobile radio communication standard. As another example, communication processor 218 may be configured to operate via a second RF transceiver of the one or more RF transceivers(s) 108 in accordance with a Medium or Wide Range mobile radio communication standard such as, e.g., a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards. As a further example, communication processor 218 may be configured to operate via a third RF transceiver of the one or more RF transceivers(s) 108 in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like). The one or more RF transceiver(s) 108 may be configured to transmit signals via antenna system 106 over an air interface. The RF transceivers 108 may each have a corresponding antenna element of antenna system 106, or may share an antenna element of the antenna system 106.

Memory 104 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

The antenna system 106 may include a single antenna or multiple antennas. In some aspects, each of the one or more antennas of antenna system 106 may be placed at a plurality of locations on the vehicle 100 in order to ensure maximum RF coverage. The antennas may include a phased antenna array, a switch-beam antenna array with multiple antenna elements, etc. Antenna system 106 may be configured to operate according to analog and/or digital beamforming schemes in order to maximize signal gains and/or provide levels of information privacy. Antenna system 106 may include separate antennas dedicated to different respective radio communication technologies, and/or antennas shared between multiple radio communication technologies. While shown as a single element in FIG. 1, antenna system 106 may include a plurality of antenna elements (e.g., antenna arrays) positioned at different locations on vehicle 100. The placement of the plurality of antenna elements may be strategically chosen in order to ensure a desired degree of RF coverage. For example, additional antennas may be placed at the front, back, corner(s), and/or on the side(s) of the vehicle 100.

Data acquisition devices 112 may include any number of data acquisition devices and components depending on the requirements of a particular application. This may include: image acquisition devices, proximity detectors, acoustic sensors, infrared sensors, piezoelectric sensors, etc., for providing data about the vehicle's environment. Image acquisition devices may include cameras (e.g., standard cameras, digital cameras, video cameras, single-lens reflex cameras, infrared cameras, stereo cameras, etc.), charge coupling devices (CCDs) or any type of image sensor. Proximity detectors may include radar sensors, light detection and ranging (LIDAR) sensors, mmWave radar sensors, etc. Acoustic sensors may include: microphones, sonar sensors, ultrasonic sensors, etc. Accordingly, each of the data acquisition units may be configured to observe a particular type of data of the vehicle's 100 environment and forward the data to the data acquisition processor 214 in order to provide the vehicle with an accurate portrayal of the vehicle's environment. The data acquisition devices 112 may be configured to implement pre-processed sensor data, such as radar target lists or LIDAR target lists, in conjunction with acquired data.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, etc. It is appreciated that vehicle 100 may have different measurement devices 116 depending on the type of vehicle it is, e.g., car vs. drone vs. boat.

Position devices 114 may include components for determining a position of the vehicle 100. For example, this may include global position system (GPS) or other global navigation satellite system (GNSS) circuitry configured to receive signals from a satellite system and determine a position of the vehicle 100. Position devices 114, accordingly, may provide vehicle 100 with satellite navigation features.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (such as images, radar signals, depth information from LIDAR, or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database (DB) 204 may include any type of database storing (digital) map data for the vehicle 100, e.g., for the control system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In some aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the control system 200 as also described with reference to FIG. 2. The vehicle 100 may include the one or more processors 102 integrated with or separate from an engine control unit (ECU) which may be included in the mobility system 120 of the vehicle 100. The control system 200 may, in general, generate data to control or assist to control the ECU and/or other components of the vehicle 100 to directly or indirectly control the movement of the vehicle 100 via mobility system 120. The one or more processors 102 of the vehicle 100 may be configured to implement the aspects and methods described herein, including performing various calculations, determinations, etc.

The components illustrated in FIGS. 1 and 2 may be operatively connected to one another via any appropriate interfaces. Furthermore, it is appreciated that not all the connections between the components are explicitly shown, and other interfaces between components may be covered within the scope of this disclosure.

Figure 3:
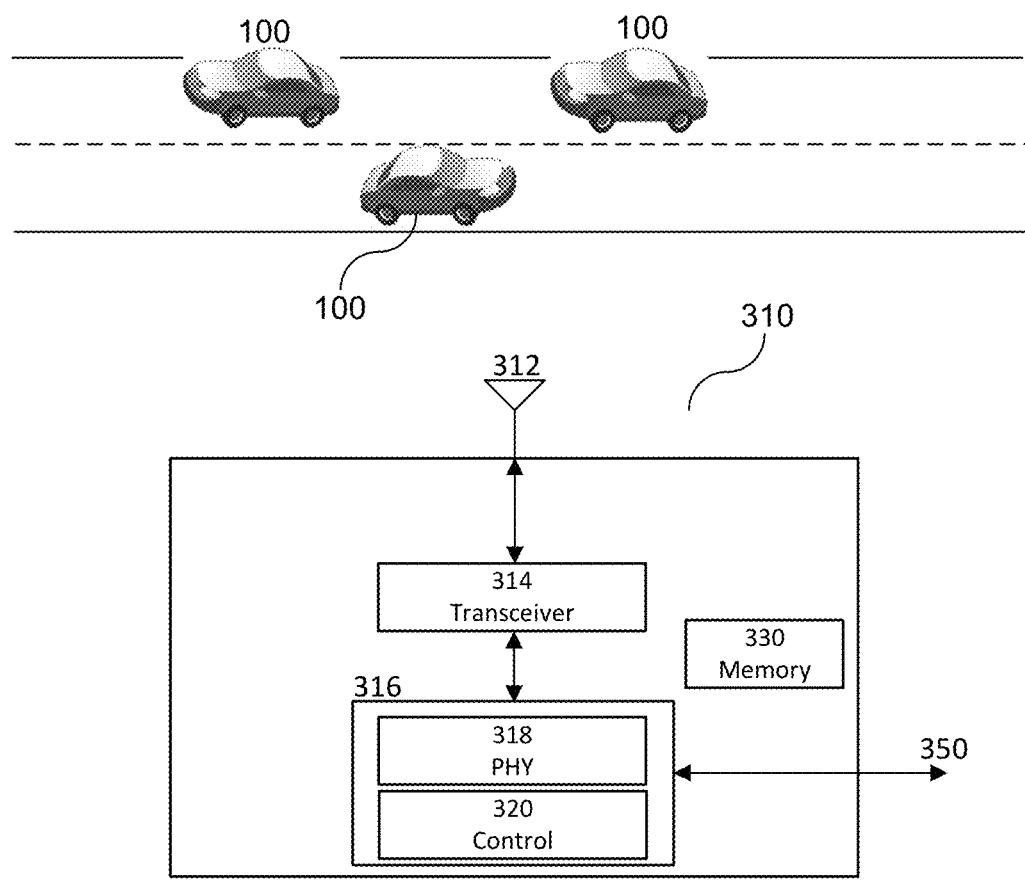
FIG. 3 shows an exemplary network area with various communication devices in accordance with various aspects of the present disclosure.

FIG. 3 shows an exemplary network area 300 according to some aspects. Network area 300 may include a plurality of vehicles 100, which may include, for example, drones and ground vehicles. Any one of these vehicles may communicate with one or more other vehicles 100 and/or with network infrastructure element (NIE) 310. NIE 310 may be a base station (e.g. an eNodeB, a gNodeB, etc.), a road side unit (RSU), a road sign configured to wirelessly communicate with vehicles and/or a mobile radio communication network, etc., and serve as an interface between one or more of vehicles 100 and a mobile radio communications network, e.g., an LTE network or a 5G network.

NIE 310 may include, among other components, at least one of an antenna system 312, a RF transceiver 314, and a baseband circuit 316 with appropriate interfaces between each of them. In an abridged overview of the operation of NIE 310, NIE 310 may transmit and receive wireless signals via antenna system 312, which may be an antenna array including multiple antenna arrays. Antenna system 312 may include multiple antenna elements (e.g., multiple antenna arrays) in order to employ multiple-input and multiple-output (MIMO) methods and schemes.

RF transceiver 314 may perform transmit and receive RF processing to convert outgoing baseband samples from baseband circuit 316 into analog radio signals to provide to antenna system 312 for radio transmission and to convert incoming analog radio signals received from antenna system 312 into baseband samples to provide to baseband circuit 316. Accordingly, RF transceiver 314 may be configured to operate similarly to the RF transceiver(s) described in FIGS. 1 and 2, albeit perhaps on a much larger scale (e.g., amplifiers to transmit higher power signals, etc.).

Baseband circuit 316 may include a controller 320 and a physical layer processor 318 which may be configured to perform transmit and receive PHY processing on baseband samples received from RF transceiver 314 to provide to a controller 320 and on baseband samples received from controller 320 to provide to RF transceiver 314. In some aspects, the baseband modem 316 may be located external to the NIE 310, e.g., at a centralized location of a mobile radio communication network. Controller 320 may control the communication functionality of NIE 310 according to the corresponding radio communication technology protocols, which may include exercising control over antenna system 312, RF transceiver 314, and physical layer processor 318. Each of RF transceiver 314, physical layer processor 318, and controller 320 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. NIE 310 may also include an interface 350 for communicating with (e.g. receiving instructions from, providing data to, etc.) with a core network according to some aspects.

Additionally, NIE 310 may include a memory 330, which may be internal to NIE 310 (as shown in FIG. 3) or external to NIE 310 (not shown). Memory 330 may store one or more maps of the coverage area of NIE 310 among other types of information. Each of the one or more maps may include a static layer depicting environmental elements that remain largely unchanged over longer periods of time (e.g., roads, structures, trees, etc.) and/or a dynamic layer with more frequent changes (e.g., vehicles, detected obstacles, construction, etc.). In some aspects, memory 330 may also store maps corresponding to one or more neighboring areas of NIE 310 so as to provide vehicles within its coverage area with information of neighboring coverage areas (e.g., to facilitate the process when a vehicle moves to the coverage of the neighboring NIE).

Vehicles, e.g., autonomous vehicles (AV) may need to navigate through different geographical areas having vastly different traffic scenarios, particularly when the navigation changes from one geographical area to another. Sometimes these changes are related to clear boundaries and differences in regulations (e.g. different maximum allowed speeds between neighboring states in US, or between countries) and sometime these boundaries are more cultural in nature (e.g. different driving behaviors in rural areas vs urban areas). However, the fact that vehicles can transverse from one region to another necessitates accounting for modification of driving safety rules to fit each geographical location.

For example, crossing boundaries (international or domestic) with diverse levels of rules/regulations/traffic situations between two adjacent zones could result in an unsafe behavior or operation of an AV.

Exemplary embodiments of the present disclosure may describe systems, methods, and devices for operating vehicles so as prevent dangerous situations occurring due to the transitioning between various areas with different traffic or driving conditions by implementing detection of safety related spatial-temporal boundaries and seamlessly adapting to local driving rules and detection of non-compliant road actors.

Route planning may provide AVs the best route to take so as to reach the destination based on a certain metric that it optimizes (shortest time or distance). However, dynamic loading of maps by incrementally loading the maps does not address the problem of transitioning of the AV from a zone with one kind of traffic pattern/rules to another different zone.

Various embodiments of the present disclosure relate to seamless update of operational rules, handover of traffic and driving information for autonomous vehicles transitioning from one region to another. The transition from one region to another may be across countries/states/regions/zones that have small to strikingly different traffic patterns. For example, US-Canada or UK-rest of EU, different counties in Europe, etc.

Figure 4:
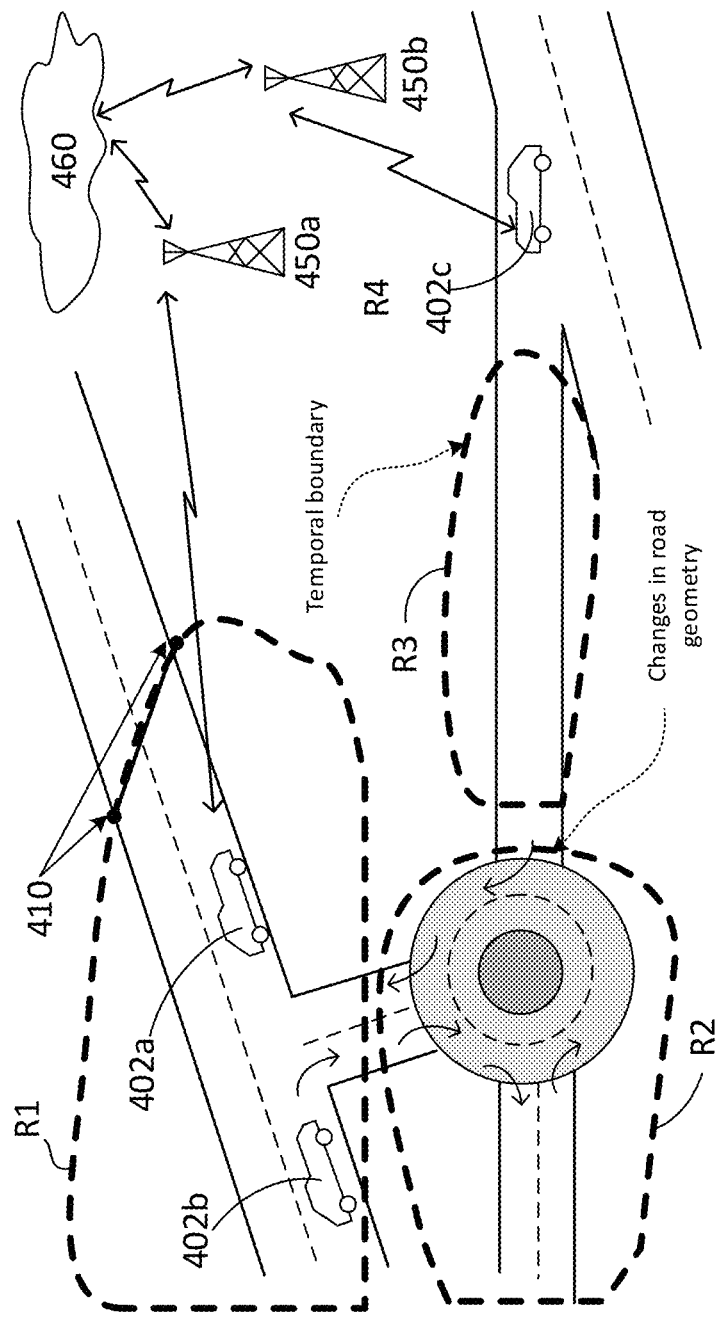
FIG. 4 and FIG. 5 show exemplary driving environments including vehicles operating therein in accordance with various aspects of the present disclosure.

FIG. 4, shows according to at least one exemplary embodiment of the present disclosure, an exemplary visual representation of several vehicles 402a-c travelling in or to several vehicular regions, designated R1, R2, R3, and R4. Each of the vehicles 402a-c may for example be any vehicle described herein, such as the vehicle 100 of FIG. 1, or may at least some of the capabilities, features, and/or components of the vehicle 100.

Vehicular regions described in various embodiment of the present disclosure, including regions R1-R4, may be spatial areas or spatially defined boundaries. Different vehicular regions may correspond to different geographical regions, e.g., areas with different legal jurisdictions and/or political jurisdictions and as a result, may have different traffic rules and/or driving conditions. That is, vehicular regions may correspond to a certain legal/political jurisdiction, such as, e.g., to a country, state, city, town, local municipality. In other cases, the vehicular region may instead or in addition correspond to areas or regions having different traffic zones, e.g., urban vs suburban vs rural. A vehicular region may also correspond to a subset of the above-described areas or may overlap one or more of the above-described areas.

The vehicular region information may not only indicate the spatial-geographical extend or boundaries, but other information. That is, vehicular regions being spatially defined, they may also be temporally defined. In one example, a vehicular region may be time-bounded, only existing or corresponding to certain hours or one or more periods of the day such as, for example, during defined rush hours, times corresponding to from dusk to dawn, etc. In other examples, vehicular may exist temporarily and as long as certain conditions exist or endure (e.g., local weather conditions, traffic or slowdowns due to e.g., accidents, etc.). In other examples, a vehicular region may be defined based on the driving behavior of the region, for example a region or area determined to currently having aggressive drivers or aggressive drivers compared to some defined baseline. Similarly, a vehicular region may correspond to areas having historically higher accident rate, or higher relative to a certain defined baseline or reference level.

In accordance with various embodiments, vehicles described herein may be aware or have information indicating vehicular regions. Referring back to FIG. 4, the vehicle 402a is depicted driving through the region R1 and is about to soon transition to region R4. In this example region R1 can correspond to a region having different traffic rules, driving conditions, and/or driver behavior from R2. Further, the vehicle 402b in region R1 is travelling a road leading into region R2 and the vehicle 402c is shown in region R4 and may be intending to travel into the region R3. The vehicles 402a-c may be driving or controlled to operate in a driving mode that may not be best suited for the vehicular regions they are intended to transition into. As such, the vehicles 402-a-c may not only be aware of the target vehicular regions into which they are to transition, but they vehicles themselves may also transition into an updated driving mode more suited for targeted vehicular regions. In other words, the vehicles 402a-c, or the control systems of the vehicles 402a-c operate or function differently to accommodate the traffic regulations and/or driving conditions for their respective targeted vehicular regions.

For example, the vehicle 402c is intending to enter the region R3 including an exit ramp that may have speed limits that differ at different times of the day. The operation or driving ability of the vehicle 402c can be improved, for example, from a safety perspective by updating its driving mode to accommodate the current speed limit of or traffic conditions at the ramp. Similarly, the vehicle 402b entering region R2 will encounter a roundabout presenting different driving challenges and different driving abilities. Therefore, to update or change their driving mode for the targeted vehicular regions, the vehicle 402a-c, or rather the respective control systems of the vehicle 402a-c which are implementing a safety driving model, may change or update driving model parameters or driving parameters of the safety driving mode. Therefore, the vehicles 402a-c may seamlessly update their driving model parameters and then implement or control the vehicle with updated driving model parameters for the safety driving model. Accordingly, vehicles 402a-c need to be aware of vehicular regions in order to update or change or determine driving model parameters for the vehicular regions, and then apply the safety driving model using the updated/changed driving model parameters at suitable location, e.g., at a border of the targeted vehicular region.

In various exemplary embodiments of the present disclosure, to change their driving mode for a targeted vehicular region, (e.g., to change, update, or determine driving model parameters for a safety driving model used by a control system for controlling/driving the vehicle), the vehicles may need to access or obtain information for the targeted vehicular region. This information may be traffic and driving information that may include information indicating operation traffic rules, traffic conditions, driving behavior, weather information, accident, and may include the driving model parameters for the targeted vehicular region. In other words, vehicles or components thereof may obtain the above-mentioned traffic and driving information and process it in order to update its driving mode, e.g., update or change its driving model parameter prior to the transition to targeted vehicular region. The traffic and driving information may be any suitable form, such as, for example, hash tables.

In accordance with various embodiments of the present disclosure, vehicles described herein may obtain or begin to obtain traffic and driving information for a targeted vehicular region at a time to ensure the vehicle has the information for updating its the driving mode of the vehicle before it transitions to a target vehicular region.

The traffic and driving information may further include boundary information, e.g., location information such as GPS coordinates that indicate at least one portion of the boundary of the vehicular region. For example, the obtained information may provide coordinates for a boundary that demarcates two different and neighboring vehicular regions. In the example of FIG. 4, the vehicle 402a may obtain traffic and driving information indicating the transition boundary portion 410 delineates a part of the boundary of region R1 which intersects a road in which the vehicle 402a uses to transition from region R1 to region R4. Such a transition boundary like boundary portion 410 may be included or indicated by the traffic and driving information or may be determined by the vehicle itself from the traffic and driving information. For example, the vehicle 402a may obtain geo-boundary information for the region R1 which can include GPS co-ordinates to and interpolating such location coordinates to determine at least one boundary portion (e.g., boundary portion 410), that intersect a road the vehicle is intending to travel through.

Various vehicles described herein may be configured to in advance obtain or download traffic and driving information for a target or intended vehicular regions. As such, vehicles described herein may need to determine a source, e.g., a reliable source for obtaining the traffic and driving information. In various embodiments, such a source may be wireless network source, a wireless source with a reliable network infrastructure (e.g., a base station, RSU, etc.). In other examples, or situations in which there is an absence or unavailability of a source network, the traffic and driving information may be obtained through other sources, such a trusted and validated peer vehicle, such as another vehicle, e.g., a AV. In embodiments, the traffic and driving information may or may not include information from governing authority, e.g., from a cloud or data center. In some cases, the traffic and driving information may be collected from the vehicle itself (e.g., sensors) and/or other vehicles that have exchanged information via peer-to-peer network.

In the example of FIG. 4, the vehicle 402a may wirelessly obtain traffic and driving information for region R4 from source 450a while the vehicle 402c may wirelessly obtain the traffic and driving information for region R3. The sources 450a and 450b may be, for example, a cellular base station, a road side unit (RSU), or any suitable source that can provide the relevant traffic information to vehicles.

The traffic and driving information may be stored or maintained in any suitable environment that is accessible by the vehicles. That is the traffic and profiling information may be stored in one or more data centers, such as one implementing in one or more databases of a cloud storage network. A governing authority may be responsible for the maintenance, updating, and for the provision or delivery of the traffic and driving information. In addition, the governing authority may be responsible or associated with the transmitting means, e.g., the sources such as wireless network sources (e.g., base station and/or RSU) that may retrieve the traffic and driving information and then wirelessly provide this information to vehicles. In some embodiments, wireless network sources may broadcast the information, e.g., without any prompting or requests from a vehicle. In other cases, the sources may provide the information in response to requests from vehicles. In the example of FIG. 4, the traffic and driving information provided by the sources 450a, b, may be electronically accessed or retrieved by the sources 450a, 450b from a data center or cloud storage 460.

In some exemplary embodiments, the traffic and driving information may also be exchanged between vehicles. That is, peer vehicles may communicate to share the traffic and driving information. Such vehicles may include communication features as describes herein that allow for peer-to-peer information exchange. Thus, one vehicle may share the traffic and information, or a portion thereof, with one or more other vehicles. This may be implemented, for example, when no reliable source/provider exists or currently exists for providing such information (e.g., the wireless network's capacity is overloaded in urban environment or is down for other technical reasons). In other cases, peer-to-peer exchange of traffic and driving information may be implemented to supplement to the traffic and driving information provided by existing sources. That is, some of the traffic and driving information may be provided by wireless source such as RSU/base station/etc. while other portions of the traffic and driving information may be provided from one or more peer vehicles.

Referring back to FIG. 4, the sources, such as sources 450a and 450b may provide such information through any suitable wireless means directly or indirectly to the vehicles. In the case of vehicle 402a, if the source 450a is not a reliable or valid source for providing traffic and profiling information for region R4, then the vehicle 402a can search for a second or other source that is valid and reliable, such as source 450b.

In accordance with various exemplary embodiments of the present disclosure, route planning information, e.g., information regarding planned navigation may be used by vehicles described herein for facilitating the transition to a target vehicular region and for the transitioning of a vehicle to a driving mode suited for the target vehicular region. Route planning information may be obtained from any suitable source, including, for example a navigational system from the vehicle or from a source operably coupled to the vehicle. The route planning information can be used by a vehicle to identify the actual areas the vehicle intends to visit. That is, the route planning information may be used so that traffic and driving information is obtained for the areas that the route planning information indicates the vehicle is intending to enter. As such, vehicles described herein may not download or obtain traffic and driving information for areas that the vehicle is the vicinity of but does not plan to enter. For example, the download can happen ahead of time, in case of a level 2/level 3 AV car when the driver transitions inadvertently and the AV makes the switch at the transition point.

Figure 5:
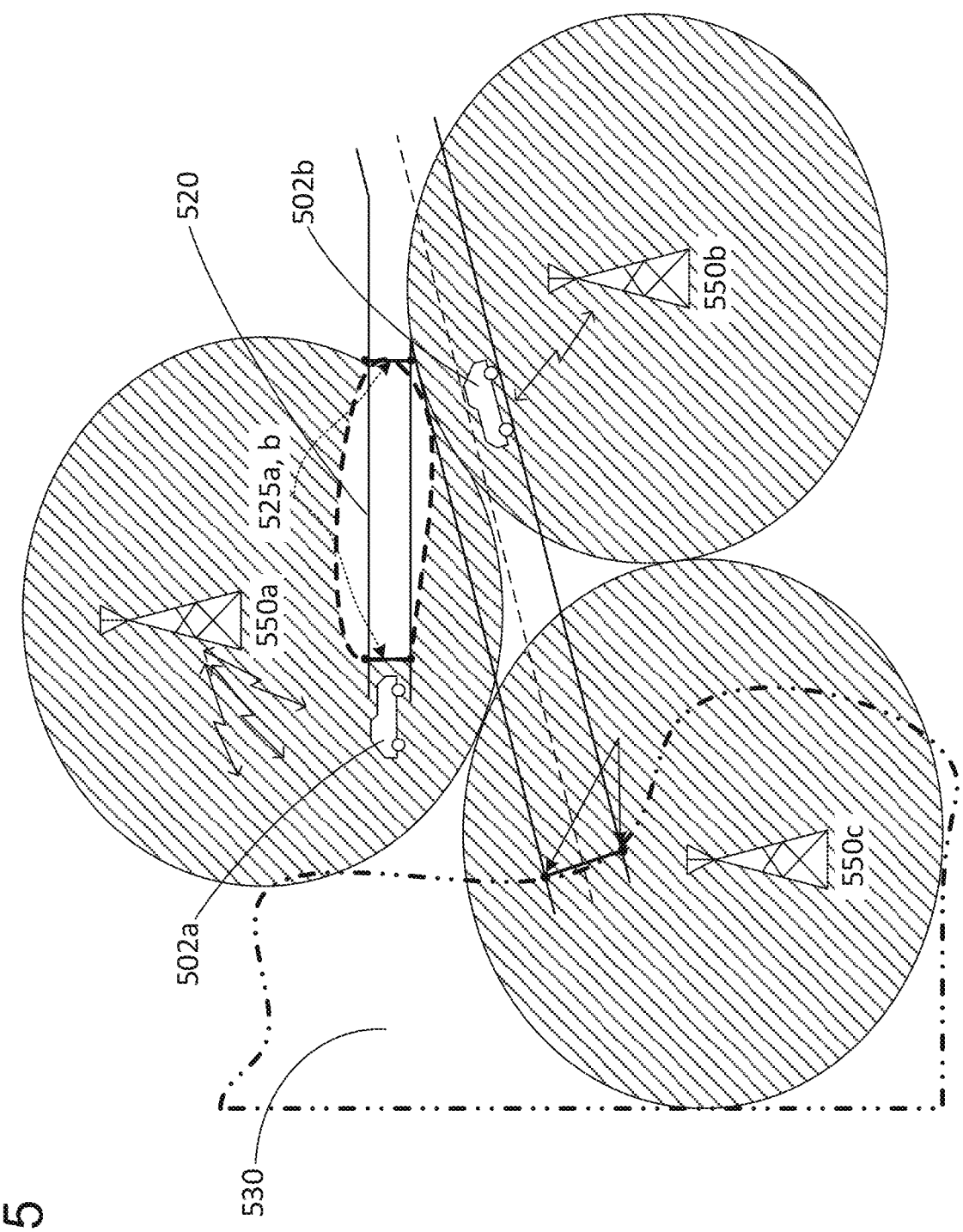

FIG. 5 illustrates another environmental scenario including vehicles scheduled to transition to target vehicular regions in accordance with exemplary embodiments of the present disclosure. Each of the vehicles 502a and 502b may be intending to enter a vehicular region. The vehicle 502a may intend to entering a vehicular region 520. In the example of FIG. 5, the vehicular region may be temporary region, e.g., existing for a period of time. The base station/RSU 550a may transmit a message or information that is received by the vehicle 502a and indicates the presence of the temporary vehicular region 520. The vehicular region 520 may not have been previously determined or identified by the vehicle 502a and may due to, for example, a traffic jam or slowdown. In one example, the base station/RSU 550a may broadcast information indicating the presence the temporary vehicular region 520 and may provide location or position coordinates (e.g., GPS coordinates). The source 550a may provide position/location coordinates identifying the entire region, or subsections thereof, such as one or more portions of its boundary, such as coordinates for the sections of the boundary that intersect with roads a road or roads vehicles may travel on in entering or exiting the vehicular region 520. The vehicle 502a process and interpolate these coordinates in order to realize a more boundary portion or portions for the region 520. As shown in FIG. 5, the vehicular boundary sections 525a, b may respectively correspond to expected entry and exit locations for the vehicle 502a.

In contrast to vehicle 502a, the vehicle 502b may be scheduled to or planning to enter a vehicular region 530, which may not be temporal. For example, the vehicle 502b may determine or identify the vehicular region 530 as spatial-geographical area e.g., corresponding to a legal/political jurisdiction, and have traffic laws or rules differing from the current location of the vehicle. As noted in various embodiments, the vehicle 502b may make an identification or determination of the vehicular region 530 from information obtained externally. In other cases, the vehicle 502b may determine or identify the vehicular region 530 from using the route planning information, without information provided by an external source, (e.g., RSU, base station, peer vehicle).

Further, after determining the (target) vehicular region 530, the vehicle 502b may then (in advance) determine or identify one or more sources, e.g., wireless external sources, that can provide the traffic and driving information for determined vehicle areas. For example, a cloud storage in the data center network that may store and maintain traffic and driving information may store and provide information indicating availability of suitable sources for providing traffic and driving information to vehicles. The vehicle 502b may request such information, after determining vehicular areas, and thus can determine beforehand which sources from which the vehicle 502b can reliably and/or timely provide the traffic and driving information. For example, in the context of FIG. 5, the vehicle 502b may determine, based on information obtained from a data center, that RSU/base station 550c may not be capable of reliably providing traffic and driving information or not capable of delivering such information before the vehicle enters the determined vehicular area because of the connection difficulties or the transmission range of the source 550c.

Accordingly, the vehicle 502b may determine that source 550b is capable of reliably providing requested traffic and driving information before the vehicle 502b reaches the vehicular area 530.

After the vehicles 502a and 502b have respectively determined a target vehicular area and have determined reliable source, the vehicles may request to download the corresponding traffic and driving information from the determined reliable external sources at an appropriate determined time or position. That is, vehicles described herein such the vehicle 502a, b may request the traffic and driving information at a time or location that the vehicle determines will be sufficient to obtain the traffic and driving information before the vehicle transitions to the determined or target vehicular region. Vehicles may determine a distance from the target vehicular region and begin obtaining the traffic and driving information when the vehicle determines this threshold distance is reached. The distance may be determined based on the connectivity with the providing source.

In FIG. 5, the vehicles 502a and 502b update or change driving parameters used by their safety driving model based on the obtained traffic and driving information. For example, the vehicle 502a may transition to operating according to a safety driving model using the updated/changed parameters at the boundary, such as 525a, or after the vehicle has determined it is within the region 520, or the vehicle 502a determines it within a predetermined range of the region 520.

In various examples, the traffic and driving information obtained by a vehicle may be used by the vehicle in order to derive or determine updated or new parameters to use for the vehicular area. In accordance with exemplary embodiments, traffic and driving information may include any of the following information or types of information:

Spatial information refers to the zones/regions where traffic patterns change and may include:
   Operation rules
      Left to right hand driving,
      speed limits, (kmph/mph etc).
   Domestic geo boundary transitions: rural to urban, state to state, region to region. International geo boundaries: country to country.
Temporal boundaries that have rules that are applicable at a certain time of the day for the same zone/region. For example, a zone that can have one set of rules during rush hour traffic and another set of rules (maybe relaxed) during the rest of the times. Temporary boundaries or regions may also refer to day/night, normal vs. severe weather conditions and so on.
Mapping and routing model data
Crash or accident statistics.
Accident or crash information aggregated over a period of time indicating zones that are prone to accidents, e.g., higher than a baseline or threshold
Current or recent events impacting the instantaneous driving behavior.
Weather and local road and driving conditions, including current as well as historical or time aggregated weather information.
Driving safety model parameters, for example, related to:
   Friction coefficient to adapt to driving conditions.
   Vehicles self-controlling their driving behavior due to over conservative/aggressive vehicles in its surroundings.

In other examples, the source providing the traffic and driving information may provide one or more of the driving parameters for the vehicle, e.g., provide parameters that the vehicle does not need derive itself. In one further example, the vehicle may be able to obtain one or more sets of driving parameters for a determined vehicular area. That is, there may be one or more sets of driving parameter data for a safety driving mode. A vehicle may choose to download and/or implement one or more selected sets of driving parameters. A vehicle may select one or more set of driving parameters and then download or obtained the selected set(s) of driving parameters for the safety driving model. In one example, the driving parameter sets may be ranked or scored, based on feedback. Such review or feedback information may be provided to a vehicle by the base station/ RSU/peer. Similar to the traffic and driving information, the feedback or review information may be maintained by governing authority and also may be stored in and accessed in the same data centers or cloud as described in other embodiments.

In other examples, a vehicle may select or choose an updated driving parameters set that may be indicated for or associated a particular type or model of vehicle that matches or closely aligns with the requesting vehicle, e.g., (SUV, compact car, minivan, etc.)

Vehicles described in various exemplary embodiments of the present disclosure, may seamlessly implement a new driving model. For example, referring back to FIG. 5, after the vehicle 502a obtains the updated or changed driving parameters, the vehicle may automatically operate according to a safety driving model using the updated/changed driving parameter(s). The vehicle 502a may, during operation of the vehicle, e.g., during the driving of the vehicle, dynamically switch to operating with a safety driving model using the updated/changed parameters. In other words, the control system of the vehicle 502a may instantaneously or near instantaneously perform a changeover to using the updated/ changed parameters from operating in a previous driving mode that was using the previous driving parameters for the safety driving model while the vehicle is in motion which is controlled by the vehicle's control system. This switch may occur at a transition boundary or other proper location.

Figure 6:
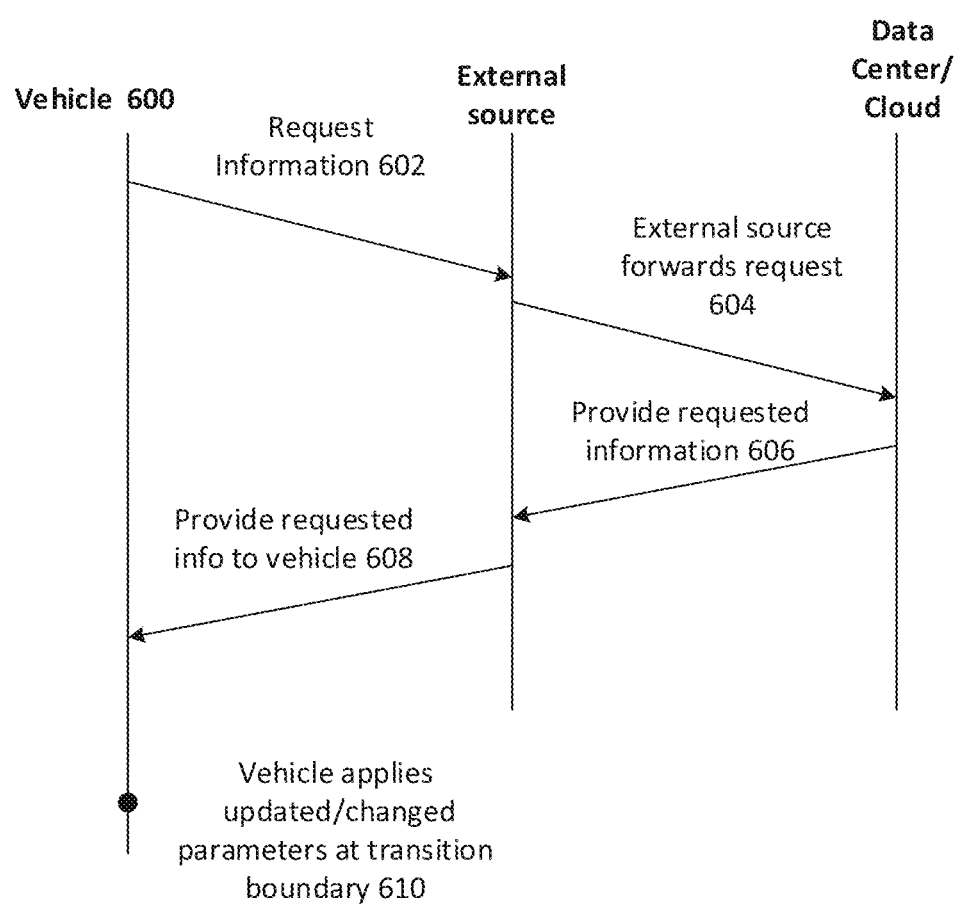
FIG. 6 AND FIG. 7 show exemplary timing diagrams in accordance with various aspects of the present disclosure.
Figure 7:
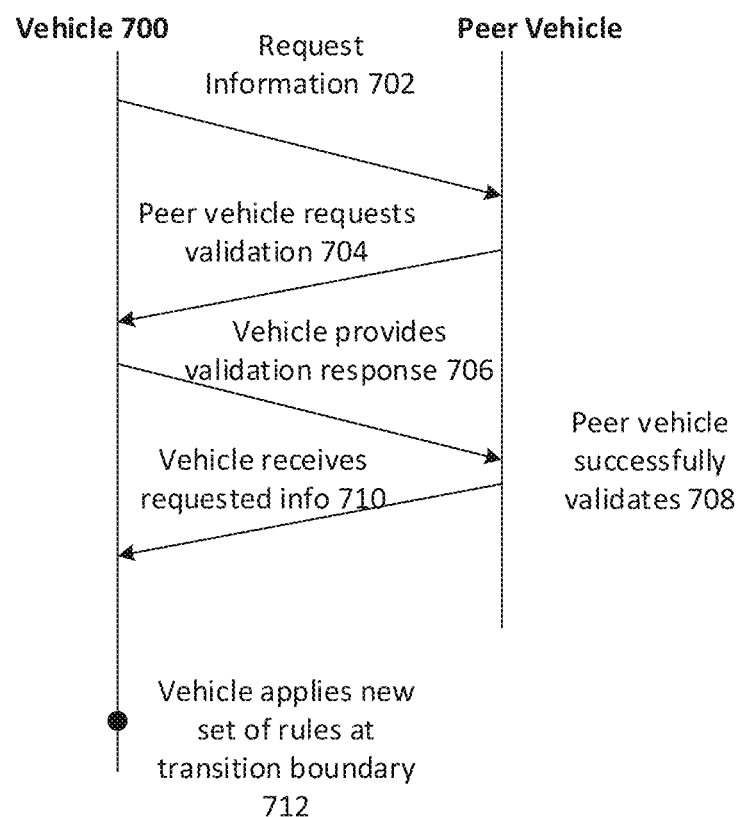

FIGS. 6 and 7 each including a timing diagram for vehicles (e.g., AVs) according to exemplary embodiments of the present disclosure. In the timing diagrams, the downward direction corresponds to increase time. In the case of FIG. 6, it may be assumed the vehicle 600 has already determined a vehicular region the vehicle is planning to transitioning into. The vehicle may be any vehicle described herein, such as, for example, the vehicle 100 of FIG. 1.

Further the vehicle 600 may have previously obtained information for determining the vehicular region already from route planning information, from previous received information from infrastructure resources, or from a peer vehicle. At 602, the vehicle in FIG. 6 request information, e.g., traffic and driving information for at least one vehicular area. The vehicle may send the request wirelessly to an external source, such as a RSU, base station, or any other suitable source. As mentioned in various embodiments herein, the vehicle may request the traffic and driving information in response to the vehicle determining its location and time with respect to the determined vehicular region.

The external source, after obtaining the request, the external source at 604 forwards the request to a data center or cloud computing environment that maintains the such information. Such a data center or cloud may be controlled or operated by an authority. The data center/cloud storage network can respond to the forwarded request, and at 606 electronically provide the traffic and driving information to the external source, which in turn, at 608 electronically provides this information to the vehicle. The vehicle then updates or changes the driving parameters of the driving safety model from the received traffic and driving information, and then implements or applies the driving safety model using the updated/changed driving parameters at 610. This vehicle can implement the new or updated/changed driving parameters at, for example, a transition boundary or immediately after determining the vehicle is in the determined vehicular area.

Referring to FIG. 7, it may also be assumed the vehicle 700 has already determined a new vehicular region the vehicle is planning to transitioning into. Again, the vehicle 700 may be any vehicle described herein, such as, for example, the vehicle 100 of FIG. 1. In the case of FIG. 7, the vehicle 700 may have already determined a target vehicular region (e.g., from external source, route planning information, etc.). Further, the vehicle 700 may determine that there is no external infrastructure source, e.g., a RSU, a base station, etc. that can provide traffic and driving information for the determined vehicular region. As such, as depicted in FIG. 7, the vehicle at 702 may wirelessly send a request for such information to another vehicle, a peer vehicle, e.g., a peer AV. The peer vehicle, in response to receiving the request, the peer vehicle at 704 may send, e.g., wirelessly, a validation request to the vehicle. That is, the peer vehicle be configured to verify that the vehicle 700 is a trusted or authorized party or entity, e.g., one that is entitled for receiving the requested information. Accordingly, at 706, the vehicle may send validation information to the peer vehicle. The validation information may be any suitable information (e.g., identification information, codes, etc.) for establishing that the vehicle is authorized to receive the requested information. Then, at 708, the peer vehicle validates the requesting vehicle based on the validation response provided. Accordingly, at 710, the peer vehicle transmits or sends the requested information (e.g., traffic and driving information for vehicular area) to the requesting vehicle. The vehicle can then update its driving parameters and implement the safety driving model with the updated parameters at a suitable time. At 712, the peer vehicle applies new set of rules at transition boundary.

Mechanisms, such as security mechanisms may be used conjunctions with aspects of exemplary embodiments of the present disclosure. For example, with respect to communication between infrastructure and vehicles, encryption methods or approaches may be used.

In the case of broadcast type communications, e.g., from a wireless infrastructure source (e.g., RSU, base station, etc.) an asymmetric encryption mechanism may be used. For example, one such is a public key infrastructure (PKI) based security mechanism. Trustworthy vehicles, e.g., trusted vehicles in the network can be assigned a public key. An application server, e.g., an application server in the data center/cloud can hold the private key. Vehicles can encrypt their data using public key and the application server would be able to decrypt the message using private key. On the other direction, if the application server encrypts broadcast messages using private key then vehicles can use a public key to decrypt the broadcast message.

In other cases, symmetric mechanism may be used for broadcast or unicast type of communications. For example, domain symmetric keys, which may be distributed on smart cards (the SIM cards) to vehicles while symmetric key information may be stored in a in data center/cloud, e.g., in a database. Only two parties may have access to the key in a SIM card.

With respect to aspects of the disclosure related to peer-to-peer communication between vehicles, encryption methods may be used. In addition, other verification or authenticating methods may be used. Each vehicle, in a peer-topeer scenario may be considered a trusted node/info store, and may have a trust score based on its past behavior and/or credibility. A trust score for each vehicle/node can be calculated and maintained by local network-infrastructure, a governing/overseeing authority/entity, or user community/evaluating entity (such as consumer protection agency or interest group or a third party). Whenever a vehicle/store sends data, it will also provide trust score with verification details. A vehicle may select vehicle or vehicles with higher trust scores and better secure environment of collecting/storing data.

In various exemplary embodiments of the present disclosure, the implementation of the updated or changed driving parameters for the safety model can include the control system that will:

- Apply the operational rules of the new region that the AV has transitioned into. For example, changes in speed, road rules, km/ph to mph road signs.
- Control the driving style of the vehicle based on local conditions such as weather, ways non-AVs are driven in the region.
- Intelligently and/or dynamically adapt to the spatial and temporal changes to the rules based on changes in traffic pattern and rules (e.g., rush hour vs. otherwise) resulting in a safe environment in the road.
- Adapt to human behavior/driving in the context for autonomous vehicles. For example, speed trap where manual driven vehicles change driving characteristics and how the AV behave or respond to such situations.
- Implement an appropriate driving approach based on the most recent crash or accident statistics. For example, adapt to a more conservative driving approach where there has been a history of frequent accidents.
- Updating of new information in spite of an absence or unavailability of a network. (e.g., obtain new information from data captured by sensors of the vehicle)
- Provide or transmit (e.g., broadcast) information that is permitted and any content that is restricted or not approved for forwarding by the infrastructure shall be withheld.
- Avoid illegal transitions where a vehicle is not allowed transition out of the region.
  - Situations where the AV does not have the updated RSS parameters causing a safety issue for other vehicles.
  - For example, control systems of rental cars that are not allowed out of a region but unintentionally or illegally attempted to transition may be prevented.
  - Implement controls for certain keys to vehicle to limit driving behavior such as teenage drivers for speed, etc.

Figure 8:
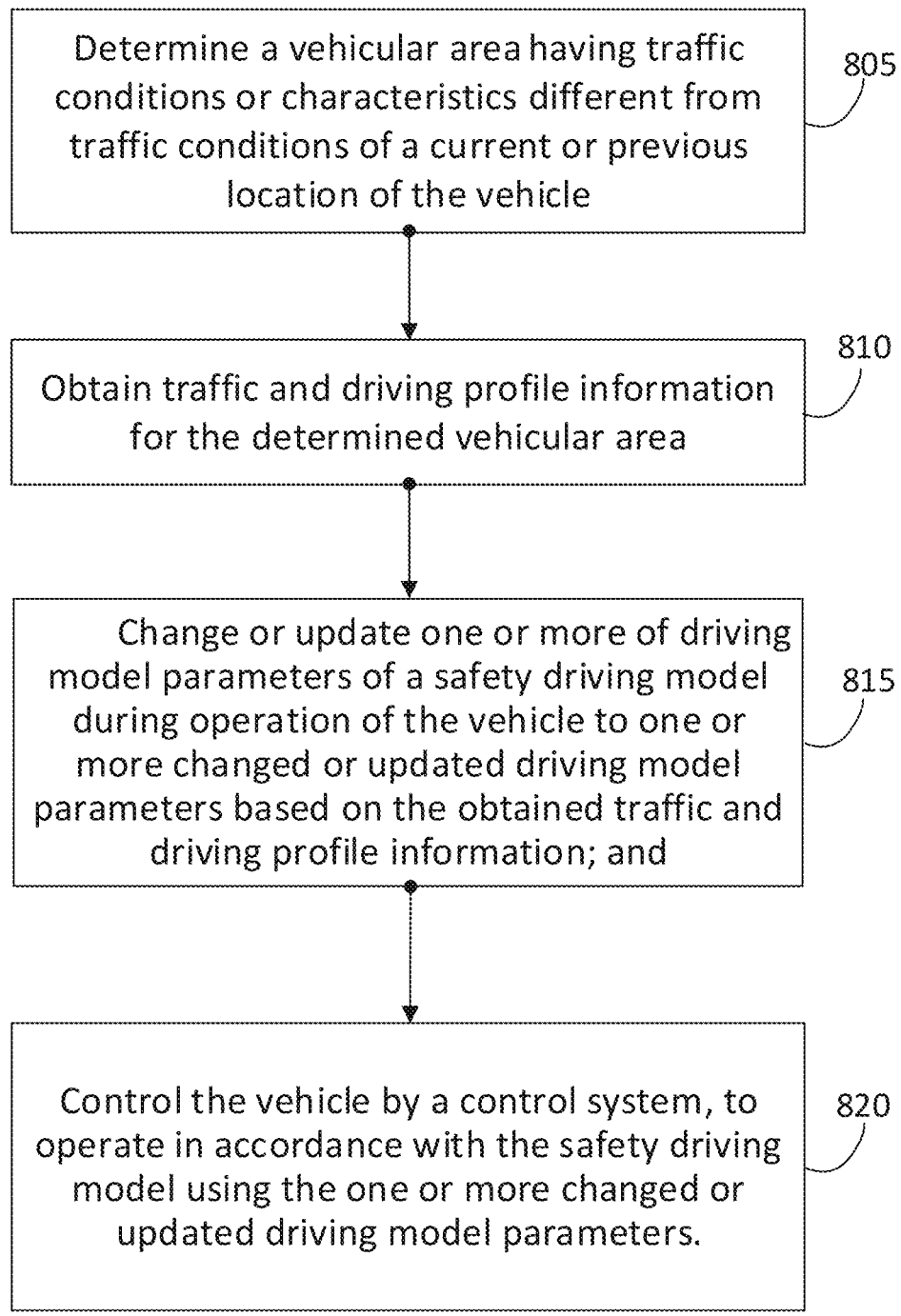
FIG. 8 shows an exemplary method in accordance with various aspects of the present disclosure.

FIG. 8, shows, according to at least one exemplary embodiment a method for operating a vehicle. The method may be implemented by a vehicle such as vehicle 100 as described herein. The method may be implemented by one or more components or subsystems of the vehicle.

The method may include, in 805, determining a vehicular area having traffic conditions or characteristics different from traffic conditions of a current or previous location of the vehicle; in 810, obtaining traffic and driving information for the determined vehicular region; in 815, changing or updating one or more of driving model parameters of a safety driving model during operation of the vehicle based on the obtained traffic and driving information; and in 820, controlling the vehicle to operate in accordance with the safety driving model using the one or more changed or updated driving model parameters.

In the following, various aspects of the present disclosure will be illustrated:

Example 1 is a method for operating a vehicle, the method may include determining a vehicular area having traffic conditions or characteristics different from traffic conditions of a current or previous location of the vehicle; obtaining traffic and driving information for the determined vehicular region; changing or updating one or more of driving model parameters of a safety driving model during operation of the vehicle based on the obtained traffic and driving information; and controlling the vehicle to operate in accordance with the safety driving model using the one or more changed or updated driving model parameters.

Example 2 is the subject-matter of Example 1, wherein determining the vehicular area may optionally include obtaining information for one or more geographical areas and determining the vehicular area from the obtained information.

Example 3 is the subject-matter of Example 2, wherein determining the vehicular area may optionally include obtaining the information for one or more geographical areas from at least one external source.

Example 4 is the subject-matter of Example 2 or Example 3, wherein determining the vehicular area may optionally include obtaining the information for one or more geographical areas from route planning information.

Example 5 is the subject-matter of any of Examples 1-4, wherein determining the vehicular area may optionally include determining a geographical area having a different political or legal jurisdiction different with different operational traffic rules from a current or previous location of the vehicle.

Example 6 is the subject-matter of any of Examples 1-5, wherein determining the vehicular area may optionally include determining a geographical area including vehicles exhibiting driving behavior or produce traffic patterns different from the current or previous location of the vehicle.

Example 7 is the subject-matter of any of Examples 1-6, wherein the determined vehicular area may optionally include one or more virtual boundaries, the one or more virtual boundaries extending over a region having at least one political or legal jurisdiction different from a current or previous location of the vehicle.

Example 8 is the subject-matter of any of Examples 1-7, wherein the determined vehicular area may optionally include a geographical area having weather conditions different from weather conditions of the current or previous location of the vehicle.

Example 9 is the subject-matter of any of Examples 1-8, wherein obtaining the traffic and driving information for the determined vehicular area may optionally include: wirelessly requesting the traffic and driving information from the at least one external source, and wirelessly obtaining the traffic and driving information from the at least one external source.

Example 10 is the subject-matter of Example 9, wherein wirelessly requesting the traffic and driving information from the at least one external source may optionally include determining at least one external source that is a valid source for obtaining the traffic information, wirelessly requesting the traffic and driving information from the at least one valid external source, and obtaining the traffic and driving information from the at least one valid external source.

Example 11 is the subject-matter of Example 10, wherein determining whether the at least one external source is a valid source for obtaining the traffic and driving information may optionally include determining whether the at least one external source is capable of providing the traffic and driving information to the vehicle before the vehicle enters the determined vehicular area.

Example 12 is the subject-matter of any of Examples 9-11, wherein the at least one external source may optionally be an external source closest in distance to the determined vehicular area.

Example 13 is the subject-matter of any of Examples 9-12, wherein the at least one external source may optionally include a road-side unit (RSU).

Example 14 is the subject-matter of any of Examples 9-13, wherein the at least one external source may optionally include a base station.

Example 15 is the subject-matter of any of Examples 9-13, wherein the at least one external source may optionally include a second vehicle.

Example 16 is the subject-matter of Example 15, wherein obtaining the traffic and driving information for the determined vehicular area may optionally further include: requesting the traffic and driving information from the second vehicle, receiving a validation request from the second vehicle, providing a proper validation message to the second vehicle, and receiving the traffic and driving information.

Example 17 is the subject-matter of any of Examples 1-16, wherein the obtained traffic and driving information may optionally include geo-spatial information for the determined vehicular area.

Example 18 is the subject-matter of any of Examples 1-17, wherein the obtained traffic and driving information may optionally include temporal information for the determined vehicular area.

Example 19 is the subject-matter of any of Examples 1-18, wherein the obtained traffic and driving information may include operational driving traffic rules for the determined vehicular area.

Example 20 is the subject-matter of any of Examples 1-19, wherein the obtained traffic and driving information may optionally include one or more safety driving model parameters for the determined vehicular area.

Example 21 is the subject-matter of any of Examples 1-20, wherein the obtained traffic and driving information may optionally include traffic or driving behavior information for the determined vehicular area.

Example 22 is the subject-matter of any of Examples 1-21, wherein the obtained traffic and driving information may optionally include weather condition information for the determined vehicular area.

Example 23 is the subject-matter of any of Examples 1-22, wherein the obtained traffic and driving information may optionally include historical statistical traffic and/or accident data for the determined vehicular area.

Example 24 is the subject-matter of any of Examples 1-23, wherein changing or updating one or more of driving model parameters of a safety driving model, e.g., during operation of the vehicle, to one or more changed or updated driving model parameters based on the obtained traffic and driving information may optionally include determining one or more of the changed or updated driving model parameters from the obtained traffic and driving information.

Example 25 is the subject-matter of any of Examples 1-24, which further may optionally include: determining a position and/or determining a distance of the vehicle to the identified/determined vehicular area; determining the vehicle is located within a predetermined distance of a boundary of the determined vehicular area; and controlling the vehicle to operate in accordance with the safety driving model including the one or more changed or updated driving model parameters in response to determining the vehicle is located within a predetermined distance of the identified/determined vehicular area.

Example 26 is the subject-matter of any of Examples 1-25, which further may optionally include: controlling the vehicle by a control system, prior to the vehicle entering the determined vehicular area, to operate in a first driving mode in accordance with the safety driving model using a first set of driving model parameters, wherein controlling the vehicle to operate in accordance with the safety driving model using the one or more changed or updated driving model parameters vehicle may include seamlessly transitioning, by the control system, from operating in accordance with the safety driving model using the first set of driving model parameters to operating in accordance with the safety driving model using the one or more changed or updated driving model parameters.

Example 27 is a safety system for a vehicle, the safety system which may include at least one memory; one or more processors coupled to the at least one memory, the one or more processors configured to: determine a vehicular area having traffic conditions or characteristics different from traffic conditions of a current or previous location of the vehicle; obtain traffic and driving information for the determined vehicular region; change or update one or more of driving model parameters of a safety driving model during operation of the vehicle based on the obtained traffic and driving information; and provide the one or more changed or updated driving model parameters to a control system of the vehicle for controlling the vehicle to operate in accordance with the driving model including the one or more changed or updated driving model parameters.

Example 28 is the subject-matter of Example 27, wherein to determine the vehicular area may optionally include to obtain information for one or more geographical areas and to determine the vehicular area from the obtained information.

Example 29 is the subject-matter of Example 28, wherein to determine the vehicular area may optionally include to obtain the information for one or more geographical areas from at least one external source.

Example 30 is the subject-matter of any of Examples 28 or 29, wherein to determine the vehicular area may optionally include to obtain the information for one or more geographical areas from route planning information.

Example 31 is the subject-matter of any of Examples 27-30, wherein to determine the vehicular area may optionally include to determine a geographical area having a different political or legal jurisdiction different with different operational traffic rules from a current or previous location of the vehicle.

Example 32 is the subject-matter of any of Examples 27-31, wherein to determine the vehicular area may optionally include to determine a geographical area including vehicles exhibiting driving behavior or produce traffic patterns different from the current or previous location of the vehicle.

Example 33 is the subject-matter of any of Examples 27-32, wherein the determined vehicular area may optionally include one or more virtual boundaries, the one or more virtual boundaries extending over a region having at least one political or legal jurisdiction different from a current or previous location of the vehicle.

Example 34 is the subject-matter of any of Examples 27-33, wherein the determined vehicular area may optionally include a geographical area having weather conditions different from weather conditions of the current or previous location of the vehicle.

Example 35 is the subject-matter of any of Examples 27-34, wherein to obtain the traffic and driving information for the determined vehicular area may optionally include to: wirelessly request the traffic and driving information from the at least one external source, and wirelessly obtain the traffic and driving information from the at least one external source.

Example 36 is the subject-matter of Example 35, wherein wirelessly requesting the traffic and driving information from the at least one external source may optionally include to: determine at least one external source that is a valid source for obtaining the traffic information, wirelessly request the traffic and driving information from the at least one valid external source, and obtain the traffic and driving information from the at least one valid external source.

Example 37 is the subject-matter of Example 36, wherein to determine whether the at least one external source is a valid source for obtaining the traffic and driving information may optionally include to determine whether the at least one external source is capable of providing the traffic and driving information to the vehicle before the vehicle enters the determined vehicular area.

Example 38 is the subject-matter of any of Examples 35-37, wherein the at least on external source may be an external source closest in distance to the determined vehicular area.

Example 39 is the subject-matter of any of Examples 35-38, wherein the at least one external source may include a road-side unit (RSU).

Example 40 is the subject-matter of any of Examples 35-39, wherein the at least one external source may include a base station.

Example 41 is the subject-matter of any of Examples 35-40, wherein the at least one external source may include a second vehicle.

Example 42 is the subject-matter of Example 41, wherein to obtain the traffic and driving information for the determined vehicular area further may include to: request the traffic and driving information from the second vehicle, receive a validation request from the second vehicle, provide a proper validation message to the second vehicle, and receive the traffic and driving information.

Example 43 is the subject-matter of any of Examples 27-42, wherein the obtained traffic and driving information may include geo-spatial information for the determined vehicular area.

Example 44 is the subject-matter of any of Examples 27-43, wherein the obtained traffic and driving information may include temporal information for the determined vehicular area.

Example 45 is the subject-matter of any of Examples 27-44, wherein the obtained traffic and driving information may include operational driving traffic rules for the determined vehicular area.

Example 46 is the subject-matter of any of Examples 27-45, wherein the obtained traffic and driving information may include one or more safety driving model parameters for the determined vehicular area.

Example 47 is the subject-matter of any of Examples 27-46, wherein the obtained traffic and driving information may include traffic or driving behavior information for the determined vehicular area.

Example 48 is the subject-matter of any of Examples 27-47, wherein the obtained traffic and driving information may include weather condition information for the determined vehicular area.

Example 49 is the subject-matter of any of Examples 27-48, wherein the obtained traffic and driving information may include historical statistical traffic and/or accident data for the determined vehicular area.

Example 50 is the subject-matter of any of Examples 27-49, wherein to change or update one or more of driving model parameters of a safety driving model during operation of the vehicle to one or more changed or updated driving model parameters based on the obtained traffic and driving information may include to determine one or more of the changed or updated driving model parameters from the obtained traffic and driving information.

Example 51 is the subject-matter of any of Examples 27-50, wherein the one or more processors may be further configured to: determine a position and/or determining a distance of the vehicle to the identified/determined vehicular area; determine the vehicle is located within a predetermined distance of a boundary of the determined vehicular area; and provide the one or more changed or updated driving model parameters to the control system in response to the determination that the vehicle is located within a predetermined distance of the identified/determined vehicular area.

Example 52 is a non-transitory computer-readable medium storing instructions which, when executed by one or more processors, make the one or more processors perform a method of any of Examples 1-26.

Example 53 is a vehicle that may include a control system configured to control the vehicle to operate in accordance with a driving model including driving model parameters; a safety system according any of Examples 27-49.

Example 54 is the subject-matter of Example 53, wherein the control system may be further configured to control the vehicle to to operate in a first driving mode in accordance with the safety driving model using a first set of driving model parameters prior to the vehicle entering the determined vehicular area.

Example 55 is the subject-matter of Example 54, wherein the control system may be configured to control the vehicle to operate in accordance with the safety driving model using the one or more changed or updated driving model parameters vehicle may include the control system to seamlessly transition from operating in accordance with the safety driving model using the first set of driving model parameters to operating in accordance with the safety driving model using the one or more changed or updated driving model parameters.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A safety system for a vehicle, the safety system comprising:
at least one memory;
one or more processors coupled to the at least one memory, the one or more processors configured to:
determine a vehicular area having traffic conditions or characteristics different from traffic conditions or characteristics of a current or previous location of the vehicle, the determined vehicular area being temporally defined so as to exist for a temporary time period;
obtain traffic and driving information for the determined vehicular area;
change or update one or more of driving model parameters of a safety driving model during operation of the vehicle based on the obtained traffic and driving information, the safety driving model comprising a mathematical model formalizing a plurality of standards and policies for safety assurance of vehicle driving operation; and
provide the one or more changed or updated driving model parameters to a control system of the vehicle for controlling the vehicle to operate in accordance with the driving model including the one or more changed or updated driving model parameters,
wherein the change or update of the one or more driving model parameters of the safety driving model comprises changing or updating one or more driving behavior parameters for implementing a navigational change without driver input during operation of the vehicle, wherein the one or more changed or updated driving model parameters are derived independently of the vehicle,
the one or more processors further configured to:
determine a position and/or determining a distance of the vehicle to the determined vehicular area;
determine the vehicle is located within a predetermined distance of a boundary of the determined vehicular area; and
provide the one or more changed or updated driving model parameters to the control system in response to the determination that the vehicle is located within the predetermined distance of the determined vehicular area.

2. The safety system of claim 1,
wherein to determine the vehicular area comprises to obtain information for one or more geographical areas and to determine the vehicular area from the obtained information.

3. The safety system of claim 2,
wherein to determine the vehicular area further comprises to obtain the information for one or more geographical areas from at least one external source.

4. The safety system of claim 1,
wherein to determine the vehicular area comprises to determine a geographical area having a different political or legal jurisdiction with different operational traffic rules from the current or previous location of the vehicle.

5. The safety system of claim 1,
wherein to determine the vehicular area comprises to determine a geographical area including vehicles exhibiting driving behavior or produce traffic patterns different from the current or previous location of the vehicle.

6. The safety system of claim 1,
wherein the determined vehicular area includes one or more virtual boundaries, the one or more virtual boundaries extending over a region having at least one political or legal jurisdiction different from the current or previous location of the vehicle.

7. The safety system of claim 1,
wherein to obtain the traffic and driving information for the determined vehicular area comprises to:
wirelessly request the traffic and driving information from at least one external source, and
wirelessly obtain the traffic and driving information from the at least one external source.

8. The safety system of claim 7,
wherein wirelessly requesting the traffic and driving information from the at least one external source comprises to:
determine at least one external source that is a valid source for obtaining the traffic and driving information,
wirelessly request the traffic and driving information from the at least one valid external source, and
obtain the traffic and driving information from the at least one valid external source.

9. The safety system of claim 7,
wherein the at least one external source comprises a road-side unit (RSU).

10. The safety system of claim 7,
wherein the at least one external source comprises a base station.

11. The safety system of claim 7,
wherein the at least one external source comprises a second vehicle.

12. The safety system of claim 1,
wherein the obtained traffic and driving information comprises geo-spatial information for the determined vehicular area.

13. The safety system of claim 1,
wherein the obtained traffic and driving information comprises temporal information for the determined vehicular area.

14. The safety system of claim 1,
wherein the obtained traffic and driving information comprises operational driving traffic rules for the determined vehicular area.

15. The safety system of claim 1,
wherein the obtained traffic and driving information comprises one or more safety driving model parameters for the determined vehicular area.

16. The safety system of claim 1,
wherein the change or update of the one or more driving model parameters comprises automatically and dynamically changing or updating the one or more driving model parameters.

17. A vehicle, comprising:
a control system configured to control the vehicle to operate in accordance with a driving model including driving model parameters, the safety driving model comprising a mathematical model formalizing a plurality of standards and policies for safety assurance of vehicle driving operation;
a safety system, comprising
  at least one memory;
  one or more processors coupled to the at least one memory, the one or more processors configured to perform:
determining a vehicular area having traffic conditions or characteristics different from traffic conditions or characteristics of a current or previous location of the vehicle, the determined vehicular area being temporally defined so as to exist for a temporary time period;
obtaining traffic and driving information for the determined vehicular area, wherein the obtained traffic and driving information includes historical statistical traffic and/or accident data for the determined vehicular area;
changing or updating one or more of driving model parameters of a safety driving model during operation of the vehicle based on the obtained traffic and driving information; and
providing the one or more changed or updated driving model parameters to the control system of the vehicle for controlling the vehicle to operate in accordance with the driving model including the one or more changed or updated driving model parameters,
wherein the change or update of the one or more of driving model parameters of the safety driving model comprises changing or updating one or more driving behavior parameters for implementing a navigational change without driver input during operation of the vehicle, wherein the one or more changed or updated driving model parameters are derived independently of the vehicle,
the one or more processors further configured to:
  determine a position and/or determining a distance of the vehicle to the determined vehicular area;
  determine the vehicle is located within a predetermined distance of a boundary of the determined vehicular area; and
  provide the one or more changed or updated driving model parameters to the control system in response to the determination that the vehicle is located within the predetermined distance of the determined vehicular area.

18. The vehicle of claim 17,
wherein the control system is further configured to control the vehicle to operate in a first driving mode in accordance with the safety driving model using a first set of driving model parameters prior to the vehicle entering the determined vehicular area.

19. The vehicle of claim 18,
wherein the control system is configured to control the vehicle to operate in accordance with the safety driving model using the one or more changed or updated driving model parameters comprises the control system configured to seamlessly transition from operating in accordance with the safety driving model using the first set of driving model parameters to operating in accordance with the safety driving model using the one or more changed or updated driving model parameters.

* * * * *